United States Patent
Aiba et al.

(10) Patent No.: US 9,450,523 B2
(45) Date of Patent: Sep. 20, 2016

(54) MOTOR DRIVE APPARATUS

(71) Applicant: MITSUBISHI HEAVY INDUSTRIES AUTOMOTIVE THERMAL SYSTEMS CO., LTD., Kiyosu-shi, Aichi (JP)

(72) Inventors: Kenichi Aiba, Tokyo (JP); Kyohei Watanabe, Tokyo (JP); Takayuki Takashige, Tokyo (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 50 days.

(21) Appl. No.: 14/344,528

(22) PCT Filed: Nov. 8, 2012

(86) PCT No.: PCT/JP2012/079030
§ 371 (c)(1),
(2) Date: Mar. 12, 2014

(87) PCT Pub. No.: WO2013/069747
PCT Pub. Date: May 16, 2013

(65) Prior Publication Data
US 2014/0340012 A1    Nov. 20, 2014

(30) Foreign Application Priority Data

Nov. 10, 2011    (JP) .................................. 2011-246652

(51) Int. Cl.
*H02P 1/24*    (2006.01)
*H02P 6/00*    (2016.01)
(Continued)

(52) U.S. Cl.
CPC ............ *H02P 6/002* (2013.01); *B60L 11/1803* (2013.01); *B60L 15/007* (2013.01);
(Continued)

(58) Field of Classification Search
CPC ..... H02P 27/085; H02P 29/0038; H02P 6/10

USPC .................................. 318/400.23, 599, 729
See application file for complete search history.

(56) References Cited

U.S. PATENT DOCUMENTS 5,561,595 A * 10/1996 Smith ................. H02M 1/4241
                                                         363/132
2007/0013339 A1    1/2007 Ma et al.
(Continued)

FOREIGN PATENT DOCUMENTS

| CN | 102349228 A | 2/2012 |
| JP | 63-92290 A | 4/1988 |

(Continued)

OTHER PUBLICATIONS

International Search Report dated Feb. 5, 2013 issued in corresponding application No. PCT/JP2012/079030.

(Continued)

*Primary Examiner* — Eduardo Colon Santana
*Assistant Examiner* — Bickey Dhakal
(74) *Attorney, Agent, or Firm* — Westerman, Hattori, Daniels & Adrian, LLP

(57) ABSTRACT

To suppress a ripple contained in current flowing into a DC power supply during one-pulse control in a motor drive apparatus receiving electric power from the DC power supply. A motor drive apparatus 1 includes an inverter control device (10) provided with a one-pulse control mode in which, during one electrical angle cycle, a positive rectangular pulse voltage and a negative rectangular pulse voltage are applied, as gate drive signals, to a switching element corresponding to each phase. When performing the one-pulse control mode, the inverter control device (10) gradually increases or reduces a duty in a predetermined phase angle width at rising and falling edges of the rectangular wave voltage.

3 Claims, 18 Drawing Sheets

(51) Int. Cl.
*B60L 15/08* (2006.01)
*B60L 11/18* (2006.01)
*B60L 15/00* (2006.01)
*B60L 15/02* (2006.01)
*B60L 15/20* (2006.01)

(52) U.S. Cl.
CPC ............ *B60L 15/025* (2013.01); *B60L 15/08* (2013.01); *B60L 15/20* (2013.01); *B60L 2240/421* (2013.01); *B60L 2240/423* (2013.01); *B60L 2270/147* (2013.01); *Y02T 10/643* (2013.01); *Y02T 10/7005* (2013.01); *Y02T 10/72* (2013.01); *Y02T 10/7275* (2013.01)

(56) References Cited

U.S. PATENT DOCUMENTS

| | | | | |
|---|---|---|---|---|
| 2007/0085508 | A1* | 4/2007 | Fujitsuna | H02P 6/185 318/712 |
| 2009/0179608 | A1* | 7/2009 | Welchko | H02M 7/53875 318/801 |
| 2011/0256005 | A1* | 10/2011 | Takeoka | H02P 6/18 417/415 |
| 2011/0316463 | A1 | 12/2011 | Yamaguchi et al. | |

FOREIGN PATENT DOCUMENTS

| | | |
|---|---|---|
| JP | 1-189566 A | 7/1989 |
| JP | 4-325894 A | 11/1992 |
| JP | 5-146160 A | 6/1993 |
| JP | 5-161364 A | 6/1993 |
| JP | 2765315 B2 | 6/1998 |
| JP | 2003-18878 A | 1/2003 |
| JP | 2003018878 A * | 1/2003 |
| JP | 2005-27390 A | 1/2005 |
| JP | 2005-137200 A | 5/2005 |
| JP | 3747259 B2 | 2/2006 |
| JP | 2007-28891 A | 2/2007 |
| JP | 2010-093931 A | 4/2010 |
| JP | 2011-211832 A | 10/2011 |
| WO | 2010/082473 A1 | 7/2010 |
| WO | 2010/104008 A1 | 9/2010 |

OTHER PUBLICATIONS

Office Action dated Feb. 16, 2016, issued in counterpart Japanese Patent Application No. 2011-246652, with English translation. (15 pages).

Chinese Office Action dated Oct. 8, 2015, issued in corresponding Chinese Patent Application No. 201280048245.0 w/English translation (12 pages).

H. Saren et al.,"Overmodulation in Voltage Source Inverter with Small DC-link Capacitor", Power Electronics Specialists Conference, 2005. PESC '05, Jun. 12, 2005, pp. 892-898 (7 pages).

Extended (supplementary) European Search Report dated Jul. 8, 2016, issued in counterpart European Patent Application No. 12847735.3. (6 pages).

* cited by examiner

FIG. 4
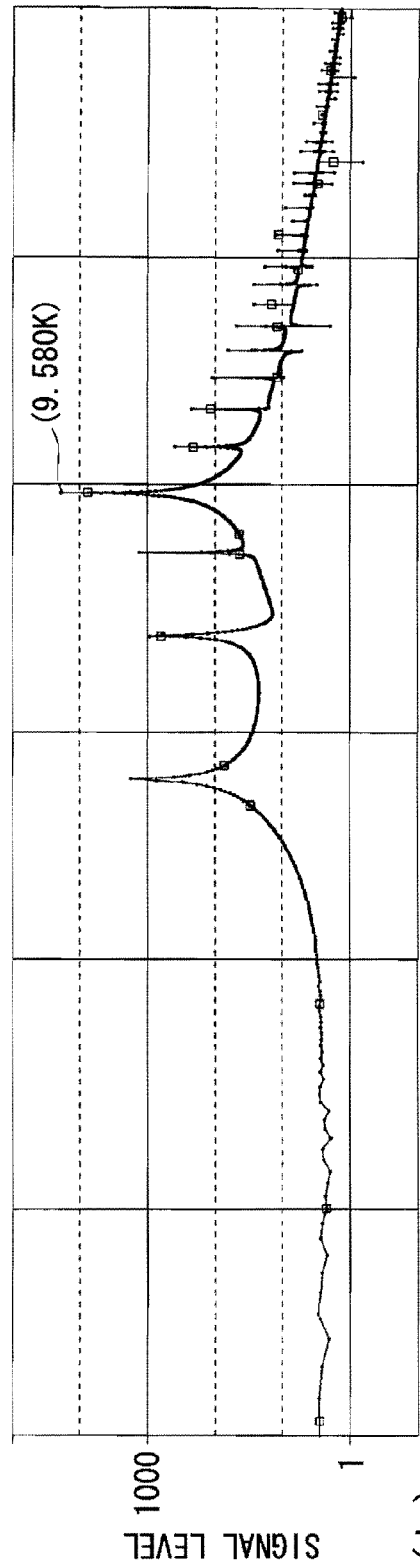
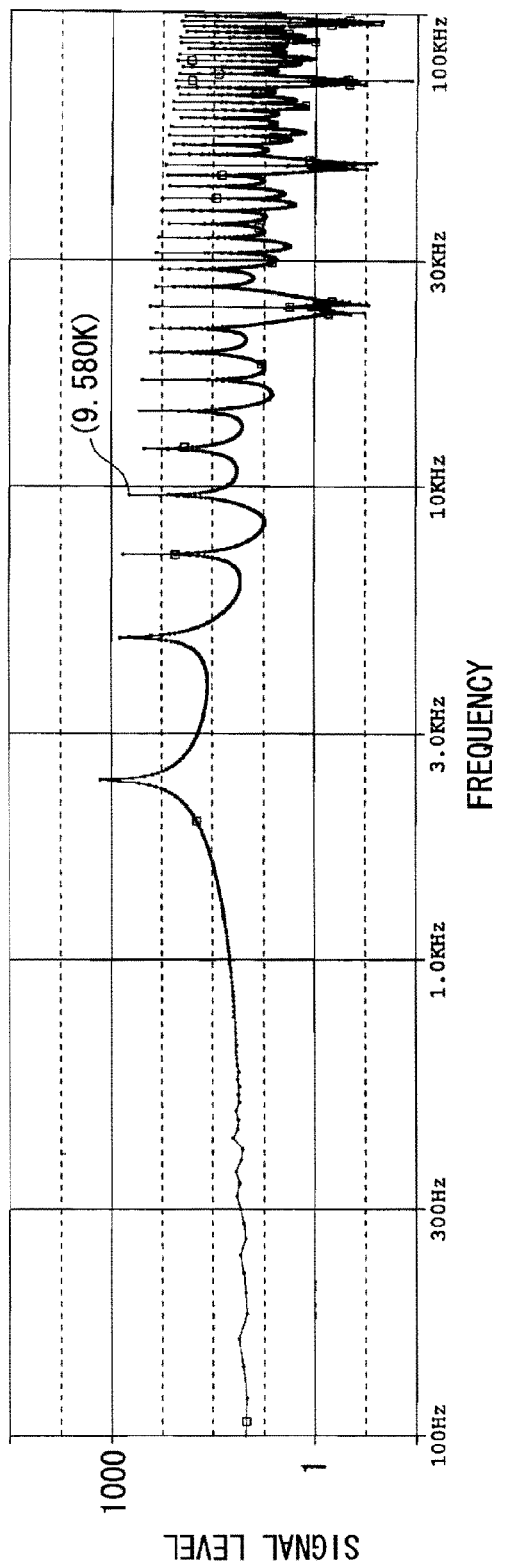

MOTOR DRIVE APPARATUS

TECHNICAL FIELD

The present invention relates to a motor drive apparatus, and more particularly to a motor drive apparatus configured to convert DC power supplied from a DC power supply into AC power, and to supply the AC power to a motor.

BACKGROUND ART

Conventionally, a motor drive apparatus is known, in which AC power from an AC power supply is converted into DC power by a rectifier, and in which the DC power is further converted into three-phase AC power by an inverter, and then the three-phase AC power is supplied to an AC motor (see, for example, PTL 1).

Further, on the other hand, a motor drive apparatus is known, in which a DC power supply is connected to an inverter, and in which DC power from the DC power supply is converted into three-phase AC power, and then the three-phase AC power is supplied to an AC motor. The motor drive apparatus of each of these types is adopted, for example, in such a case of driving a compressor motor of a vehicle air conditioner mounted on an electric vehicle not equipped with an engine.

Further, one-pulse control is conventionally known as one of the control methods for improving the voltage utilization factor of an inverter. The one-pulse control is a control method in which, during one electrical angle cycle, a positive rectangular pulse voltage and a negative rectangular pulse voltage are applied to each switching element corresponding to each of the three phases (see, for example, PTL 2).

CITATION LIST

Patent Literature

{PTL 1}
Japanese Unexamined Patent Application, Publication No. Hei5-161364
{PTL 2}
Japanese Unexamined Patent Application, Publication No. 2005-137200

SUMMARY OF INVENTION

Technical Problem

Meanwhile, when the one-pulse control disclosed in PTL 2 is performed, relatively large harmonic current flows through the DC bus. However, in the motor drive apparatus to which electric power is supplied from the AC power supply, it is necessary to rectify the AC power, and hence a smoothing capacitor having relatively large capacitance (generally of an order of 1,000 μF) is provided. The harmonics are reduced by this smoothing capacitor, and hence a ripple (pulsating current) contained in the current flowing into the AC power supply is not so large.

However, in the motor drive apparatus to which electric power is supplied from a DC power supply, it is not necessary to perform the rectification. Therefore, a smoothing capacitor having a very small capacitance (generally of an order of 10 μF to 100 μF) is adopted in order to reduce cost and size of the apparatus. For this reason, the harmonic components generated by the one-pulse control cannot be effectively reduced by the smoothing capacitor, and hence a relatively large ripple is contained in the current flowing into the DC power supply. Therefore, it is worried that the ripple affects, as noise, peripheral apparatuses connected to the DC power supply.

The present invention is to provide a motor drive apparatus receiving electric power from a DC power supply, the motor drive apparatus being capable of suppressing a ripple contained in the current flowing into the DC power supply during execution of the one-pulse control.

Solution to Problem

A first aspect of the present invention provides a motor drive apparatus including: an inverter configured to convert DC power inputted from a DC power supply via a DC bus into three-phase AC power; and an inverter control device provided with a one-pulse control mode in which, during one electrical angle cycle, a positive rectangular pulse voltage and a negative rectangular pulse voltage are applied, as gate drive signals, to a switching element corresponding to each phase, the motor drive apparatus being configured such that, when the one-pulse control mode is performed, the inverter control device gradually increases or reduces a duty in a predetermined phase angle width at rising and falling edges of the rectangular wave voltage.

In the first aspect of the present invention, when a one-pulse control mode, in which during one electrical angle cycle, a positive rectangular pulse voltage and a negative rectangular pulse voltage are applied, as gate drive signals, to a switching element corresponding to each phase, is performed, the duty of the rectangular wave voltage is gradually increased or reduced in a predetermined phase angle width at rising and falling edges of the rectangular wave voltage. Therefore, it is possible to reduce the amount of the change of the voltage, the change being generated at the time of on/off switching of the switching elements of the inverter. Thereby, it is possible to reduce the ripple contained in the current flowing into the DC power supply.

In the above-described motor drive apparatus, it is preferred that the predetermined phase angle width is set according to a power factor angle.

The present inventors obtained new knowledge that the power factor angle is related to the harmonic components contained in the current flowing through the DC bus, and decided to set a predetermined phase angle width according to a power factor angle. Thereby, the ripple contained in the current flowing into the DC power supply can be effectively reduced.

In the above-described motor drive apparatus, it is preferred that the predetermined phase angle width is set to a value twice or more a maximum value of the power factor angle estimated by using a maximum motor rotation speed and a maximum motor torque.

In such configuration, for example, the maximum value of the power factor angle is estimated beforehand by a simulation using the maximum motor rotation speed and the maximum motor torque, and the predetermined phase angle width is set to a value twice or more the estimated maximum value of the power factor angle. In this way, when the predetermined phase angle width is set to a value twice or more the maximum value of the power factor angle, harmonic components (ripple) contained in the current flowing into the DC power supply can be effectively reduced even in an operation region in which the power factor angle is largest. In other words, during the one-pulse control, harmonic components contained in the current flowing into the DC power supply can be reduced over the entire region of change of the power factor angle.

Advantageous Effects of Invention

The present invention has the effect that the ripple contained in the current flowing into the DC power supply can be suppressed during the one-pulse control.

BRIEF DESCRIPTION OF DRAWINGS

FIG. 4 is a view showing results of frequency analysis of the bus current and the DC current which are shown in FIG. 3.

DESCRIPTION OF EMBODIMENTS

In the following, a motor drive apparatus according to an embodiment of the present invention will be described with reference to the accompanying drawings.

First, a simulation performed to study a ripple generated in a current flowing through a DC bus connecting a DC power supply to an inverter is described before description of the motor drive apparatus according to the present embodiment.

Figure 1:
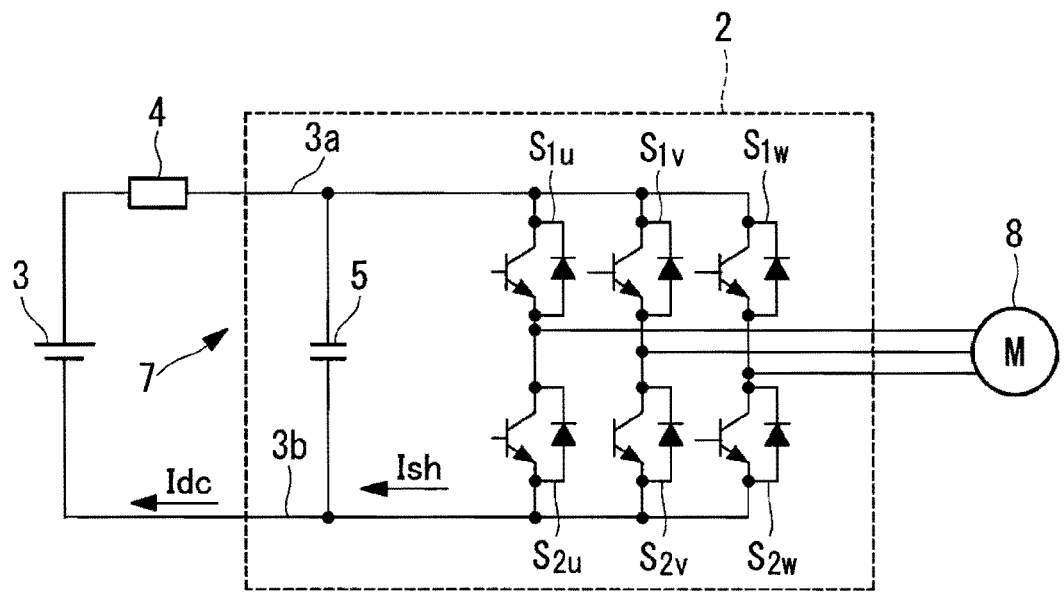
FIG. 1 is a circuit diagram schematically showing a general configuration of a motor drive apparatus connected to a DC power supply.

FIG. 1 is a circuit diagram schematically showing a general configuration of a motor drive apparatus connected to a DC power supply. In FIG. 1, an inverter 2 is connected to a DC power supply 3 by positive and negative DC buses 3a and 3b. A coil 4 is connected to the positive DC bus 3a. A smoothing capacitor 5 is connected between the positive DC bus 3a and the negative DC bus 3b. A low pass filter 7 is formed by the coil 4 and the smoothing capacitor 5.

The inverter 2 is provided with switching elements $S_{1u}$, $S_{1v}$ and $S_{1w}$ of an upper arm, each of the switching elements being provided so as to correspond to each phase, and is provided with switching elements $S_{2u}$, $S_{2v}$ and $S_{2w}$ of a lower arm, each of the switching elements being provided so as to correspond each phase. These switching elements are controlled by an inverter control device (not shown), and thereby three-phase AC power to be supplied to an IPM motor (Interior Permanent Magnet Motor) 8 is generated from DC power.

Figure 2:
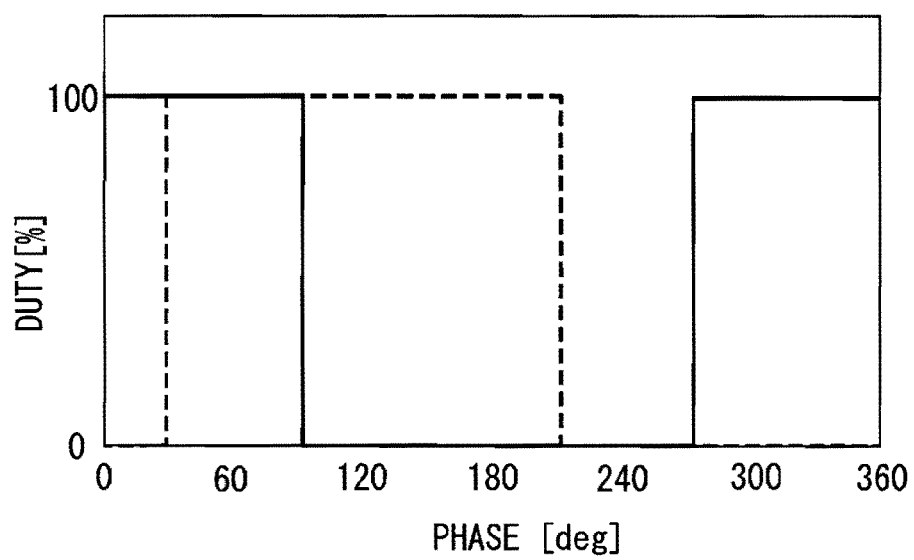
FIG. 2 is a view showing duty waveforms of gate drive signals based on conventional one-pulse control.

Current flowing through the negative DC bus 3b of the motor drive apparatus was obtained by simulation in a case where a rectangular pulse voltage based on the conventional one-pulse control is applied, as a gate drive signal, to each of the switching elements of the inverter 2. FIG. 2 is a view showing duty waveforms of the gate drive signals based on the conventional one-pulse control. FIG. 2 shows on-duty waveforms of the gate drive signals respectively applied to the U- and V-phase switching elements of the upper arm. The on-duty waveform (not shown) of the gate drive signal applied to the W-phase switching element of the upper arm becomes a waveform obtained by shifting, by the phase angle of 120°, the on-duty waveform of the gate drive signal applied to the V-phase switching element. Further, each of the switching elements of the lower arm is operated complementarily to each of the switching elements of the upper arm, and hence the on-duty of the upper arm corresponds to the off-duty of the lower arm.

Further, in this simulation, the frequency of resonance between the inductance of the coil 4 and the capacitance of the smoothing capacitor 5 is set to 9.589 [kHz], and the command value of the motor rotational speed is set to 133 [rps] which is 1/72 times the resonance frequency (9.589 [kHz]) of the low pass filter 7.

Figure 3:
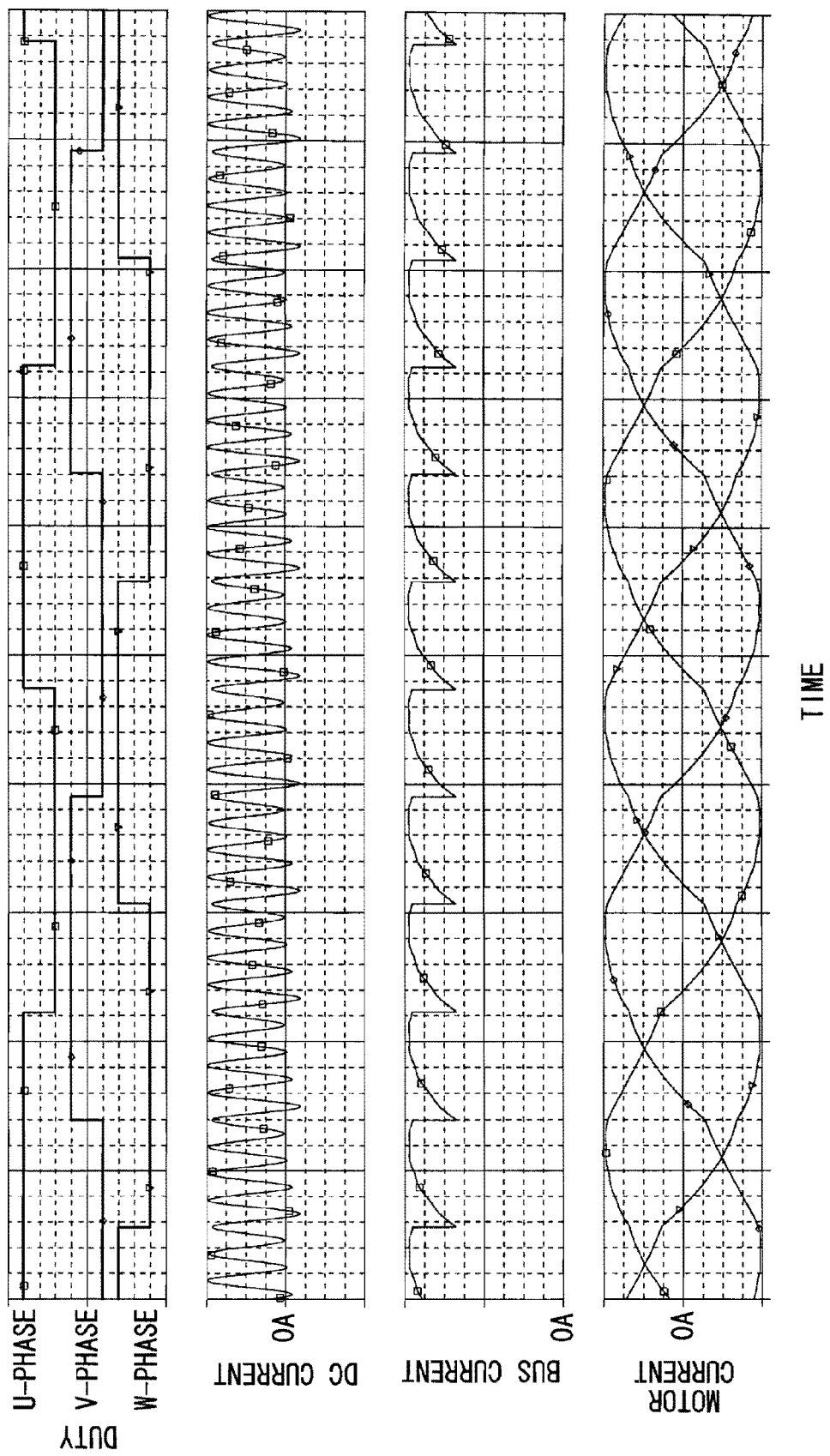
FIG. 3 is a view showing simulation results of bus current and DC current at the time when the gate drive signals based on the conventional one-pulse control are applied.

FIG. 3 is a view showing simulation results. In FIG. 3, "duty" denotes duty waveforms, on the basis of which the gate drive signals applied to the U-, V- and V-phase switching elements of the upper arm are respectively generated, and "DC current" Idc denotes current flowing through a portion of the negative DC bus 3b, the portion being located on the side of the power supply from the connection point Sa of the DC bus 3b and the smoothing capacitor 5. Further, "bus current" Ish denotes current flowing through a portion of the negative DC bus 3b, the portion being located on side of the inverter from the connection point Sa of the DC bus 3b and the smoothing capacitor 5, and "motor current" denotes each phase current outputted to the IPM motor 8 from the inverter 2.

It can be seen from FIG. 3 that the DC current Idc and the bus current Ish are resonating. In order to analyze the resonance states, frequency analysis was performed by subjecting the DC current Idc and the bus current Ish to Fast Fourier transform.

FIG. 4(a) shows the result of the frequency analysis of the DC current Idc shown in FIG. 3, and FIG. 4(b) shows the result of the frequency analysis of the bus current Ish shown in FIG. 3. From FIG. 4, it was seen that n-th harmonic components of the fundamental wave frequency fn of the DC current Idc are generated, and further that the value of the fourth harmonic component is particularly large. Here, the fundamental frequency fn is given by the following expression (1).

$$fn=\text{the number of revolutions} \times \text{the number of pole pairs} \times a=133[\text{rps}] \times 3 \times 6=2.394[\text{kHz}] \quad (1)$$

In the above-described expression (1), a denotes the number of times at which the gate drive signal is changed during one motor cycle. In the present embodiment, the pattern of the gate drive signal is changed at each electrical angle of 60 [deg], and hence a is set as a=6.

Here, it was seen from the frequency analysis that the fourth harmonic component of the fundamental frequency fn substantially coincides with the resonance frequency 9.589 [kHz] of the low pass filter 7, and that a particularly large ripple component is generated by the resonance between the fourth harmonic component and the low pass filter 7.

Figure 5:
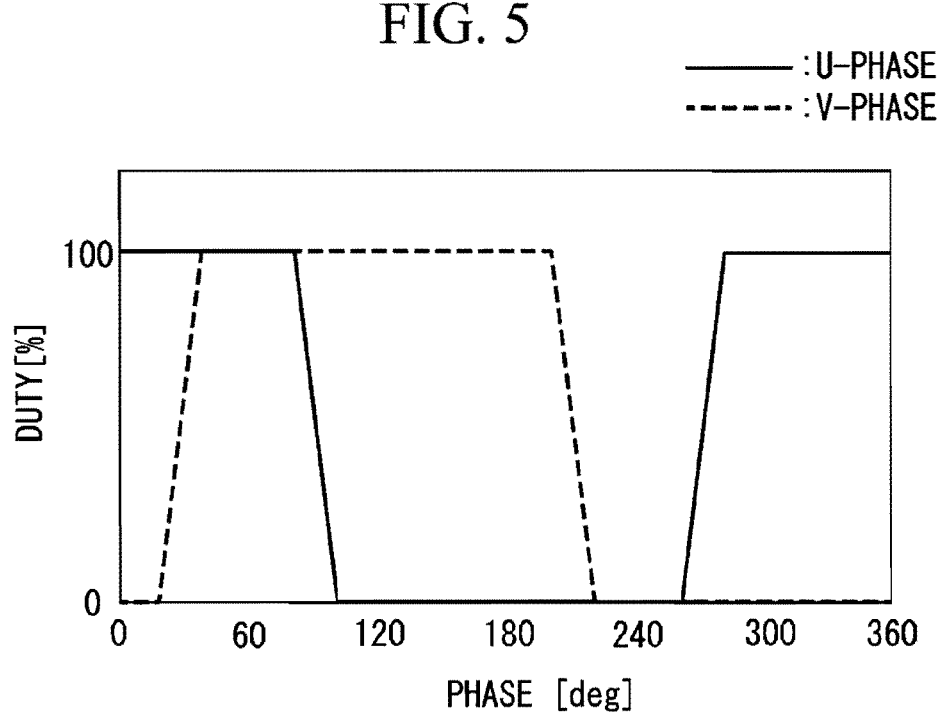
FIG. 5 is a view showing an example of duty waveforms according to an embodiment of the present invention.

In order to reduce the harmonic components generated in the DC current Idc and the bus current Ish in the above-described analysis results, the motor drive apparatus according to the present embodiment was configured such that the duty waveform of the gate drive signal, which is conventionally applied in a step function manner as shown in FIG. 2, is gradually increased or decreased, as shown in FIG. 5, in a predetermined phase angle width of the gate drive signal at the rising and falling edges of the gate drive signal. It should be noted that FIG. 5 shows waveforms at the time when the duty is increased or reduced in a linear function manner in a predetermined phase angle width. However, the waveform at the time when the duty waveform is increased or reduced can be arbitrarily selected. For example, as shown in FIG. 6, the waveform may be an increasing waveform or a decreasing waveform formed in such a manner of cutting a part of a sinusoidal wave.

Figure 7:
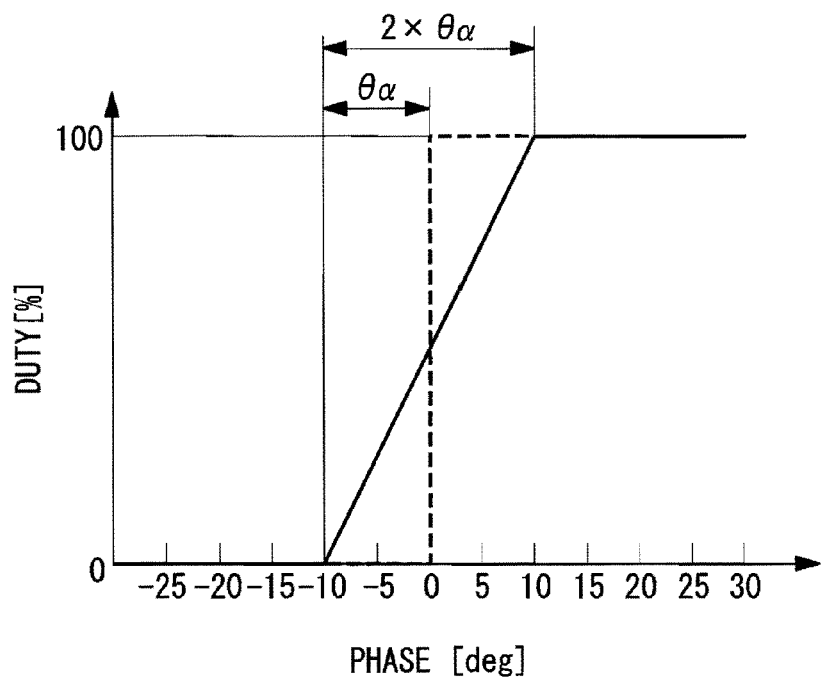
FIG. 7 is a view exemplifying a case where the waveform at the rising edge of the duty waveform of the gate drive signal is increased linearly in a phase angle width of 20 [deg].

FIG. 7 exemplifies a case where the duty waveform at the rising edge of the gate drive signal is increased linearly in a phase angle width of 20 [deg]. In FIG. 7, the on-duty waveform in the conventional one-pulse control is shown by broken lines for comparison purposes. Further, in the present embodiment, one half of the phase angle width is defined as an overlapping phase angle $\theta_\alpha$.

Figure 6:
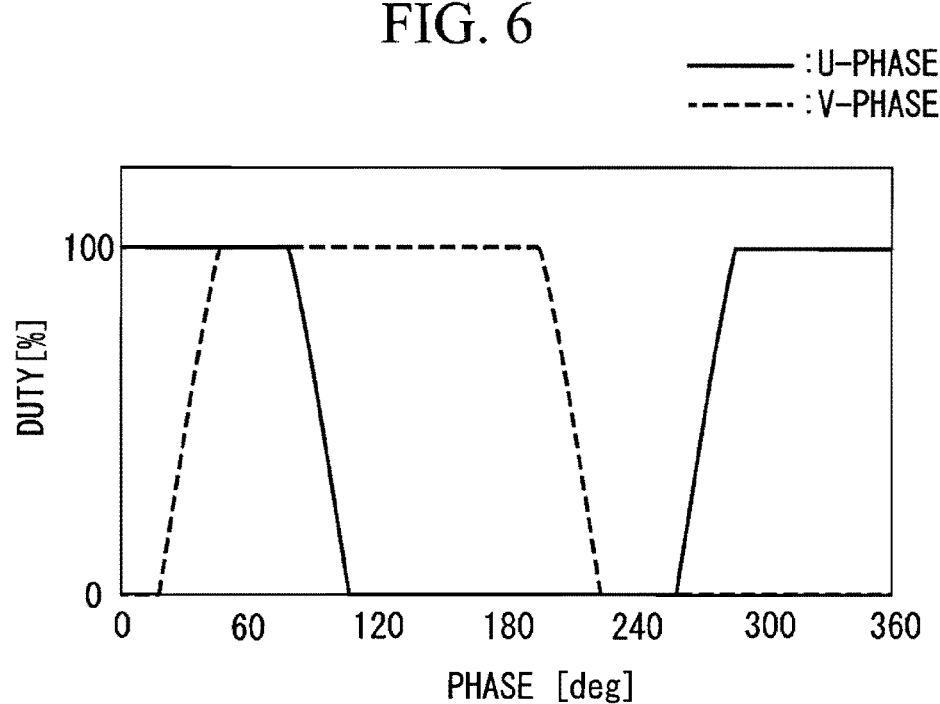
FIG. 6 is a view showing another example of the duty waveforms according to the embodiment of the present invention.
Figure 8:
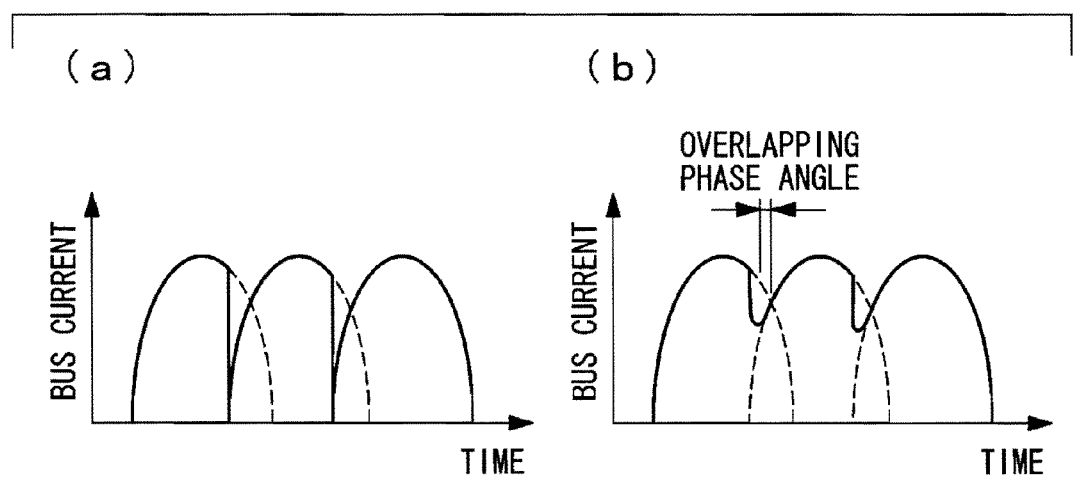
FIG. 8 is a view for explaining the effect of the embodiment of the present invention, the effect being exerted on the bus current of the motor drive apparatus according to the embodiment of the present invention.

When the overlapping phase angle $\theta_\alpha$ is provided in the duty waveform as shown in the examples of FIG. 5 to FIG. 7, the waveform of the bus current Ish can be changed as shown in FIG. 8(b), so that the harmonic components contained in the bus current Ish can be reduced.

FIG. 8(a) is a view schematically showing a bus current waveform at the time when the rectangular wave voltage as shown in FIG. 2 is applied in the conventional one-pulse control. FIG. 8(b) is a view schematically showing a bus current waveform at the time when the overlapping phase angle $\theta_\alpha$ is provided as shown in FIG. 5 to FIG. 7.

As can be seen from FIG. 8(b), when a certain fixed phase width is provided, and when in the phase width, the duty is changed gradually from 0 [%] to 100 [%] or 100 [%] from 0 [%], the motor current flowing between two phases can be continuously changed. Thereby, the harmonic components of the bus current Ish can be reduced. Further, in the period of the predetermined phase width in which the duty is gradually changed, the energy of harmonics can be dispersed, for example, by performing switching operation at the carrier frequency. Also with this effect, the harmonics can be reduced.

Next, the present inventors investigated the value of the overlapping phase angle $\theta_\alpha$ at which the harmonic components can be most effectively reduced. Here, the present inventors paid attention to the power factor and investigated the relationship between the power factor and the overlapping phase angle $\theta_\alpha$.

Figure 9:
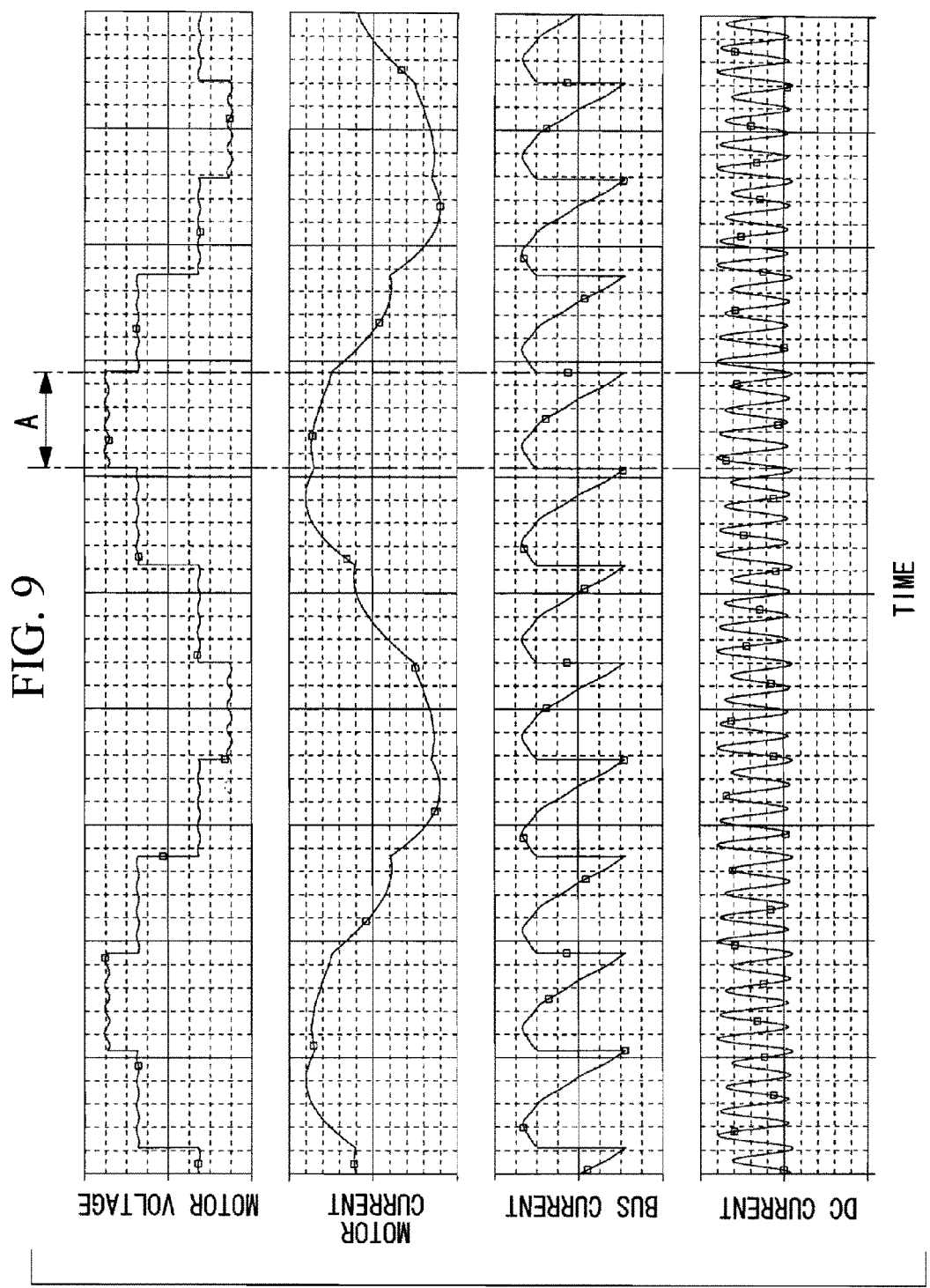
FIG. 9 is a view showing simulation results of bus current and DC current at the time when the conventional one-pulse control is performed in a state of an advance power factor.
Figure 10:
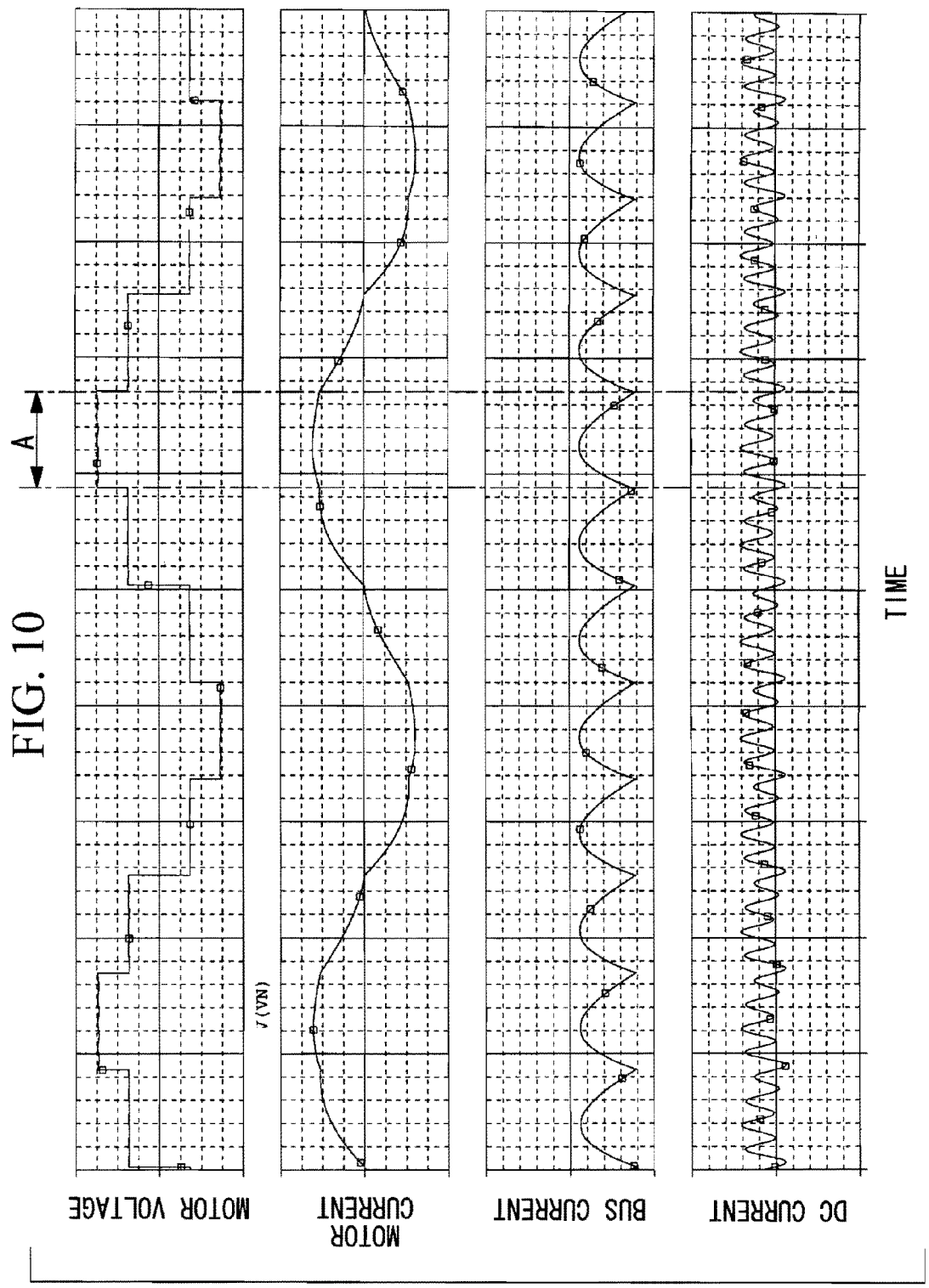
FIG. 10 is a view showing simulation results of bus current and DC current at the time when the conventional one-pulse control is performed in a state where the power factor is one.
Figure 11:
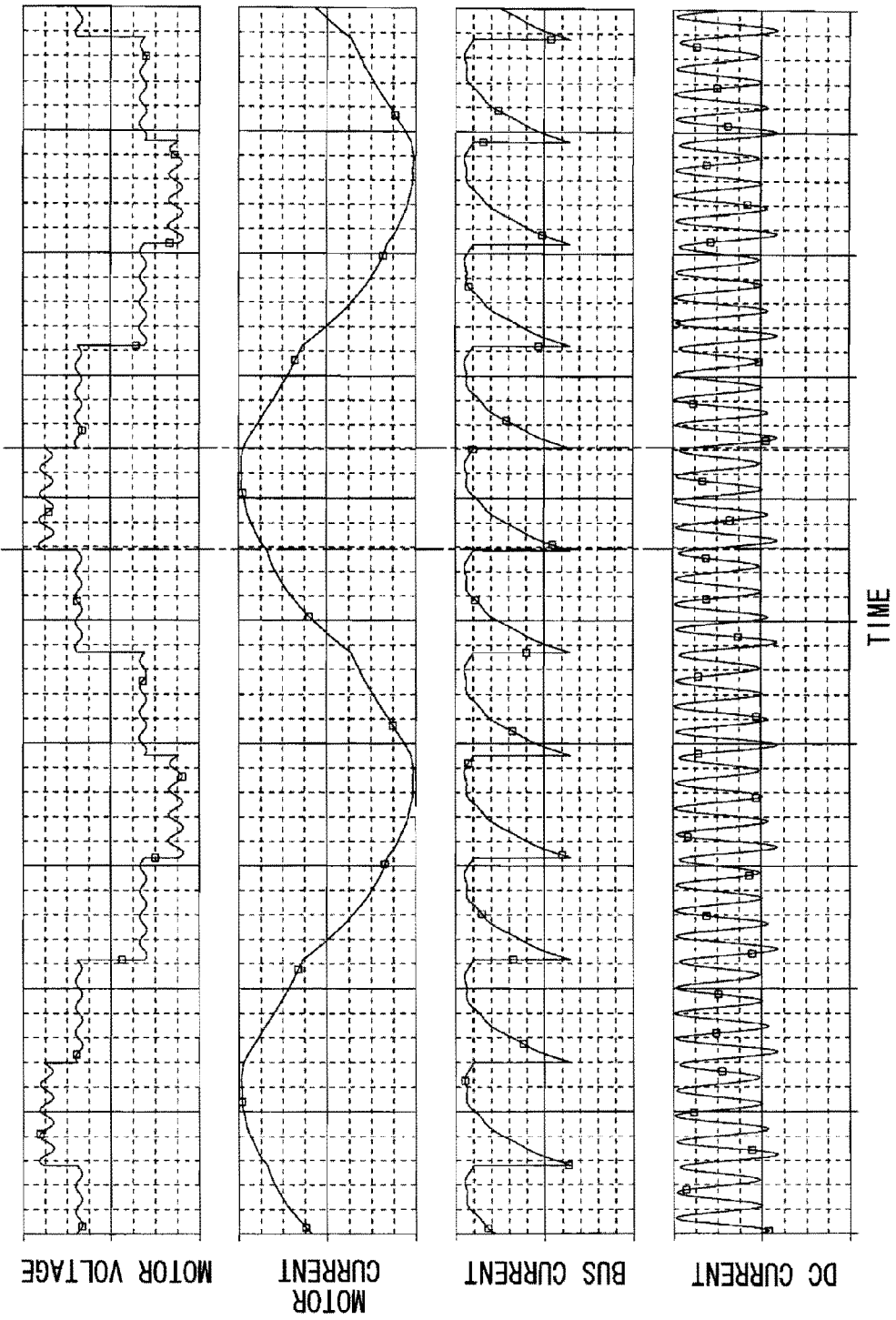
FIG. 11 is a view showing simulation results of bus current and DC current at the time when the conventional one-pulse control is performed in a state of a delay power factor.

First, in the conventional one-pulse control in which the duty is changed in a step function manner, the motor terminal voltage (U-phase), the motor current (U-phase), the bus current Ish, and the DC current Idc were obtained by simulation for each of three cases of: a case of power factor of one, a case of advance power factor (=0.94), and a case of delay power factor (=0.98). The results of the simulation are shown in FIG. 9 to FIG. 11. FIG. 9 shows the case of advance power factor, FIG. 10 shows the case of power factor of one, and FIG. 11 shows the case of delay power factor.

It can be seen from FIG. 9 to FIG. 11 that, as shown in FIG. 10, a ripple contained in the DC current Idc is small in the case of the power factor of one, but as shown in FIG. 9 and FIG. 11, a relatively large ripple is generated in the DC current Idc in each of the cases of advance power factor and delay power factor. This is because, as can be seen from the waveforms shown in period A in FIG. 9 to FIG. 11, when the power factor is changed, the phase (position), at which the motor current is switched to flow as the bus current Ish, is changed, so that the bus current Ish is greatly changed at the time when the phase of the inverter 2 is switched. It was seen that, when the amount of the change of the bus current Ish is increased, the harmonic components contained in the bus current Ish are increased, so that the ripple of the DC current Idc is also increased.

Figure 12:
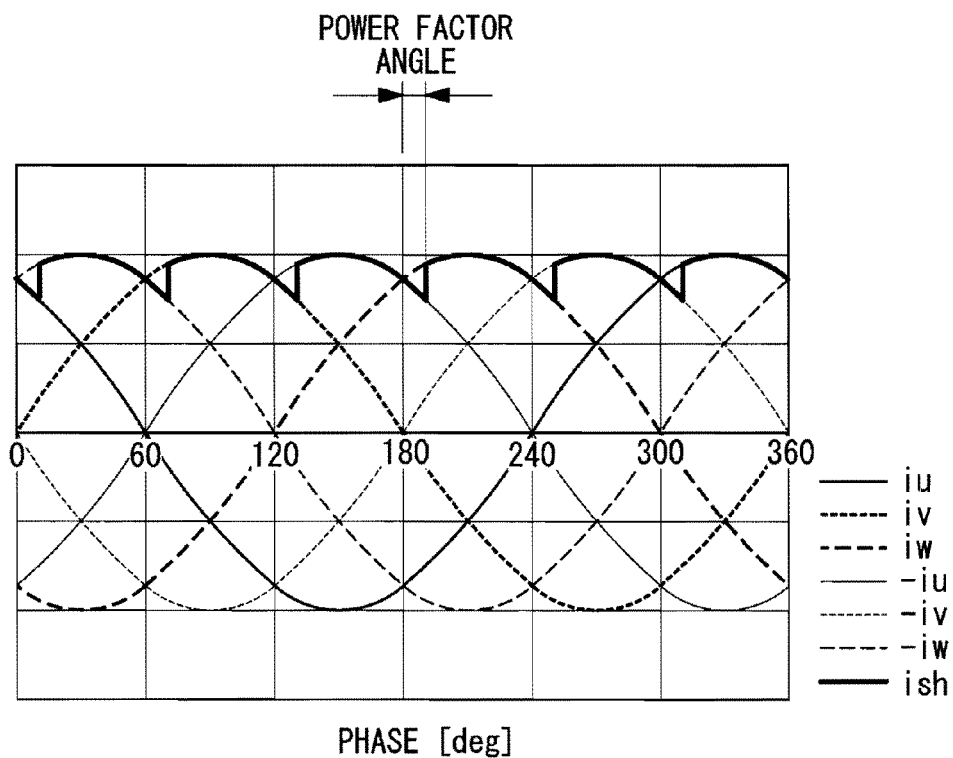
FIG. 12 is a view schematically showing a relationship of the bus current Ish with the (positive and negative) U-, V-, W-phase currents at the time when the conventional one-pulse control is performed in a state of an advance power factor.
Figure 13:
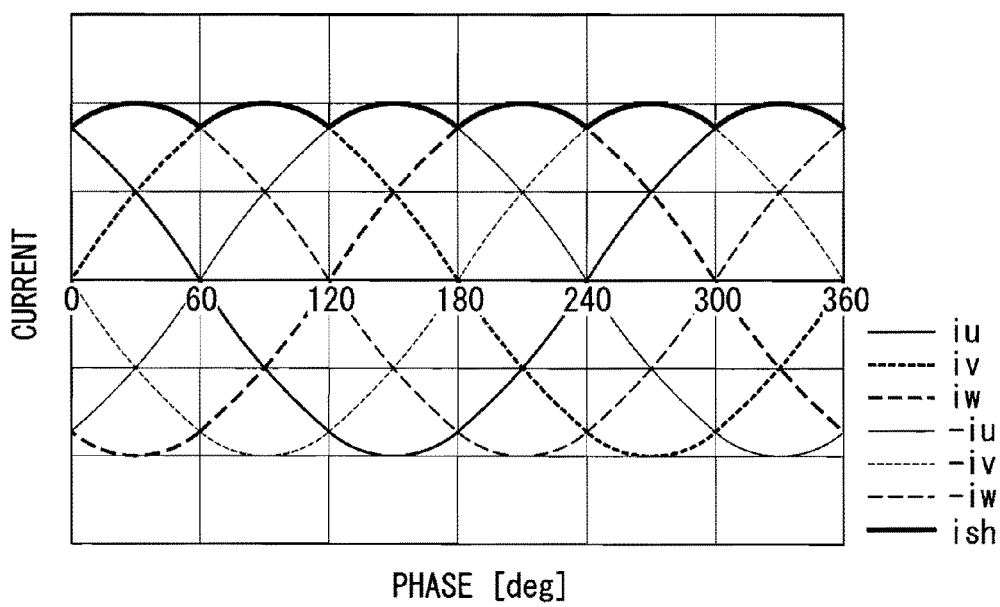
FIG. 13 is a view schematically showing a relationship of the bus current Ish with the (positive and negative) U-, V-, W-phase currents at the time when the conventional one-pulse control is performed in a state where the power factor is one.
Figure 14:
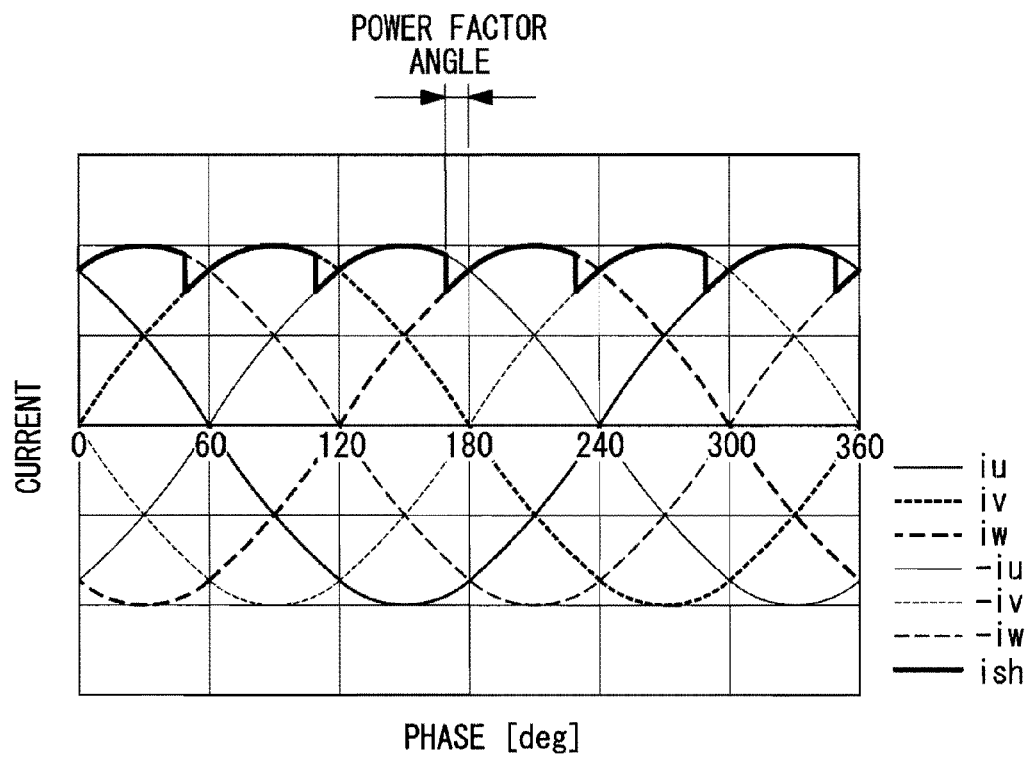
FIG. 14 is a view schematically showing a relationship of the bus current Ish with the (positive and negative) U-, V-, W-phase currents at the time when the conventional one-pulse control is performed in a state of a delay power factor.

Each of FIG. 12 to FIG. 14 is a view schematically showing a relationship of the bus current Ish with the (positive/negative) U-, V- and W-phase currents in each of the phase factors shown in FIG. 9 to FIG. 11. FIG. 12 shows the case of advance power factor, FIG. 13 shows the case of power factor of one, and FIG. 14 shows the case of delay power factor. It was seen from FIG. 12 to FIG. 14 that the difference between the timing at which the bus current Ish is switched by the switching of the switching elements, and the timing at which the bus current Ish is almost equal to the negative motor current of the phase adjacent to the bus current Ish approximately becomes a power factor angle. It was seen that, when the duty is gradually changed in this period set as the overlapping phase angle $\theta_\alpha$, the variation of the bus current Ish can be suppressed and hence the harmonic components can be expected to be reduced.

Figure 15:
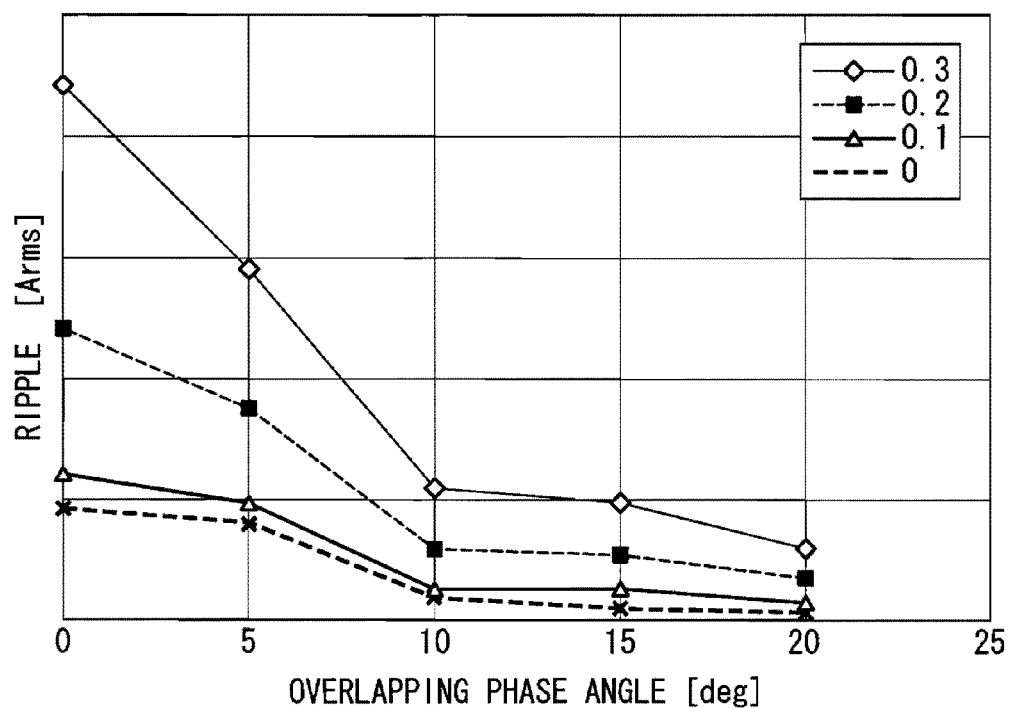
FIG. 15 is a view showing a relationship between the overlapping phase angle and the ripple contained in DC current at the time when the ratio between the magnitude of motor voltage and the magnitude of induced voltage is set as 1:0.8 and when the value of a is changed to each of 0, 0.1, 0.2 and 0.3.
Figure 16:
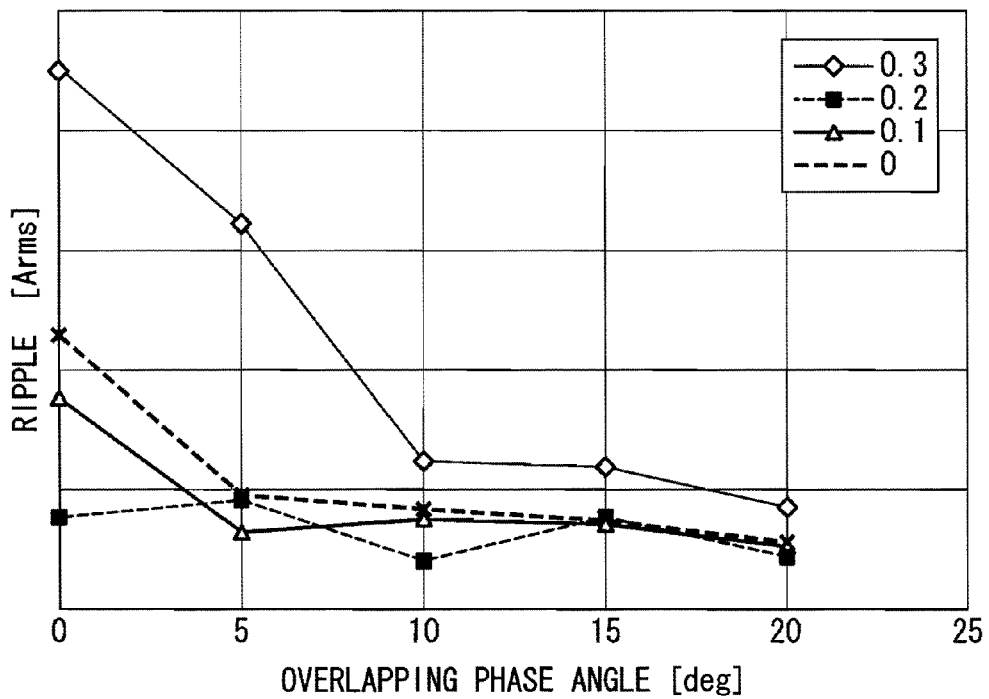
FIG. 16 is a view showing a relationship between the overlapping phase angle and the ripple contained in DC current at the time when the ratio between the magnitude of motor voltage and the magnitude of induced voltage is set as 1:1 and when the value of a is changed to each of 0, 0.1, 0.2 and 0.3.
Figure 17:
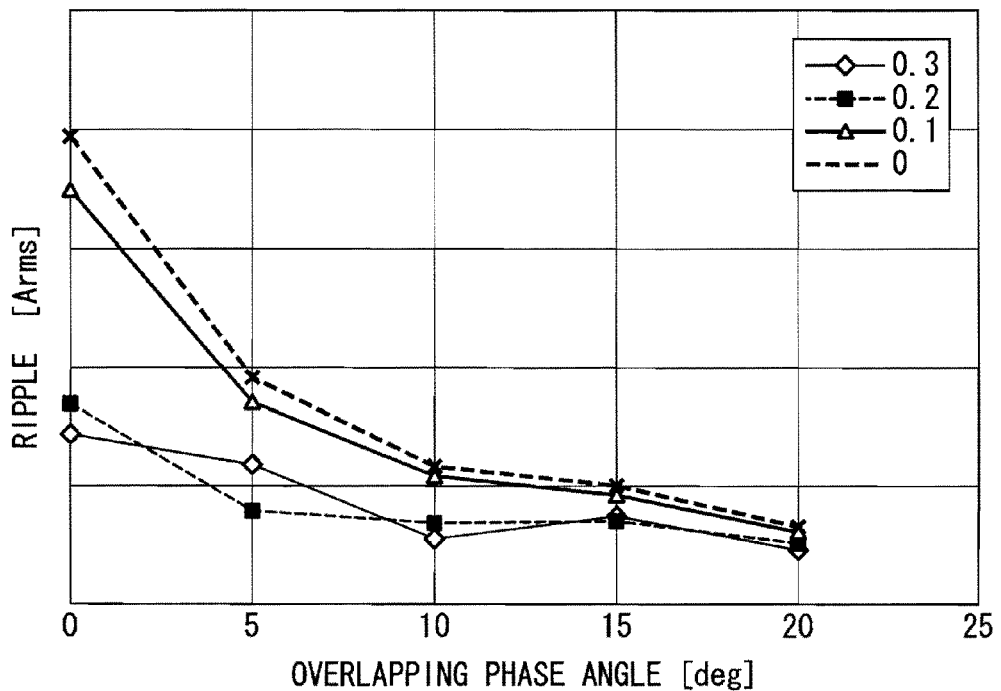
FIG. 17 is a view showing a relationship between the overlapping phase angle and the ripple contained in DC current at the time when the ratio between the magnitude of motor voltage and the magnitude of induced voltage is set as 1:1.2 and when the value of a is changed to each of 0, 0.1, 0.2 and 0.3.

Therefore, a simulation of the change of the ripple was performed by changing the power factor condition and the overlapping phase angle $\theta_\alpha$. The results of the simulation are shown in FIG. 15 to FIG. 17. Here, in the simulation, the power factor angle $\phi$ cannot be directly controlled, and hence the power factor angle $\phi$ is indirectly changed by changing, as shown in FIG. 18, the ratio of the magnitude of the motor voltage V and the magnitude of the induced voltage E, and the value of $\alpha$ of expression $\alpha \times \pi$ [rad] which represents the angle between the motor voltage V and the induced voltage E.

Figure 18:
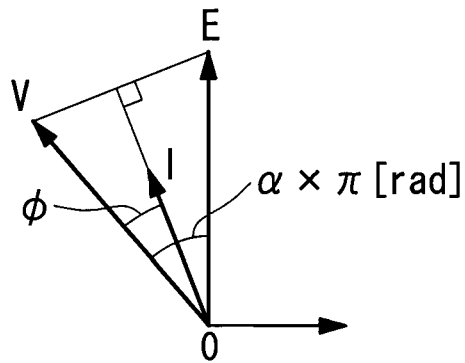
FIG. 18 is a view for explaining a relationship between the motor voltage, the induced voltage, the angle α, the motor current, and the power factor angle in the simulation results shown in FIG. 15 to FIG. 17.

That is, as shown in FIG. 18, the motor voltage V is set at an angle $\alpha \times \pi$ [rad] with respect to the direction of the induced voltage E, and the vector of the motor voltage V and the vector of the induced voltage E are connected with each other by a straight line. In this case, when the resistance component is neglected, the vector orthogonal to this straight line and passing through the origin 0 becomes the vector of the current I. Therefore, the power factor angle $\phi$ is obtained as the angle between the motor voltage V and the current I. FIG. 18 exemplifies a case where the ratio of the magnitude of the motor voltage V and the magnitude of the induced voltage E is 1:1. It can be seen from FIG. 18 that the power factor angle $\phi$ can be changed by changing the magnitude of the motor voltage V, and the magnitude of the induced voltage E, or by changing the angle $\alpha$ formed by the motor voltage V and the induced voltage E.

FIG. 15 is a view showing a relationship between the overlapping phase angle $\theta_\alpha$ and the ripple contained in the DC current Idc at the time when the ratio of the magnitude of the vector of the motor voltage V and the magnitude of the vector of the induced voltage E is set as 1:0.8, and when the value of $\alpha$ is set to each of 0, 0.1, 0.2 and 0.3. Similarly, FIG. 16 is a view showing a relationship between the overlapping phase angle $\theta_\alpha$ and the ripple contained in the DC current Idc at the time when the ratio of the magnitude of the vector of the motor voltage V and the magnitude of the vector of the induced voltage E is set as 1:1. FIG. 17 is a view showing a relationship between the overlapping phase angle $\theta_\alpha$ and the ripple contained in the DC current Idc at the time when the ratio of the magnitude of the vector of the motor voltage V and the magnitude of the vector of the induced voltage E is set as 1:1.2.

Here, the ripple (distortion current) was calculated for all orders of harmonics by the following expression.

ripple=√[(effective value of DC current)$^2$−(average value of fundamental component of DC current)$^2$]

As shown in FIG. 15 to FIG. 17, it was seen that, although the value of overlapping phase angle $\theta_\alpha$, at which the ripple reducing effect is exhibited, is changed according to the power factor angle $\phi$, the ripple reducing effect is exhibited in the range of the overlapping phase angle $\theta_\alpha$ of about 10 [deg] or more.

In this way, it was verified from FIG. 15 to FIG. 17 that the harmonic components contained in the DC current Idc can be reduced by providing the overlapping phase angle $\theta_\alpha$.

Figure 19:
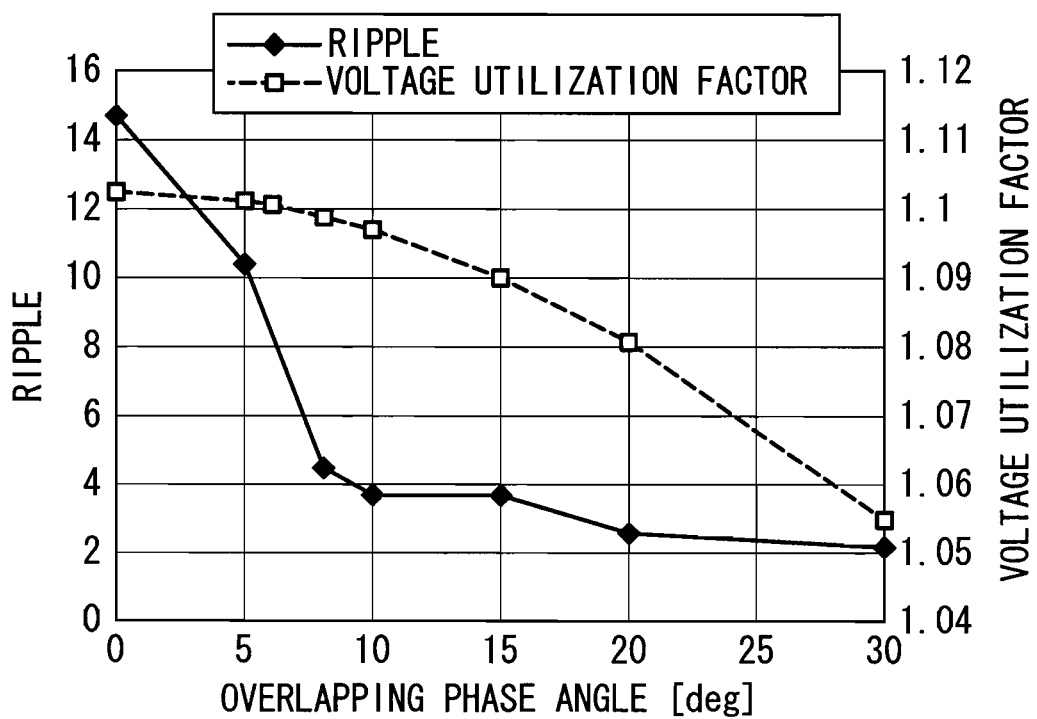
FIG. 19 is a view showing a relationship between the overlapping phase angle $\theta_\alpha$, the ripple, and the voltage utilization factor in a certain power factor angle $\phi$.

Next, the relationship between the overlapping phase angle $\theta_\alpha$ at a certain power factor angle $\phi$, the ripple, and the voltage utilization factor was analyzed. FIG. 19 shows a graph in which the horizontal axis indicates the overlapping phase angle [deg] and the vertical axis indicates the ripple and the voltage utilization factor. It can be seen from FIG. 19 that the voltage utilization factor is reduced according to the increase of the overlapping phase angle [deg], and further that the ripple current is effectively reduced in a range of the overlapping phase angle of about 10 [deg] or more.

Figure 20:
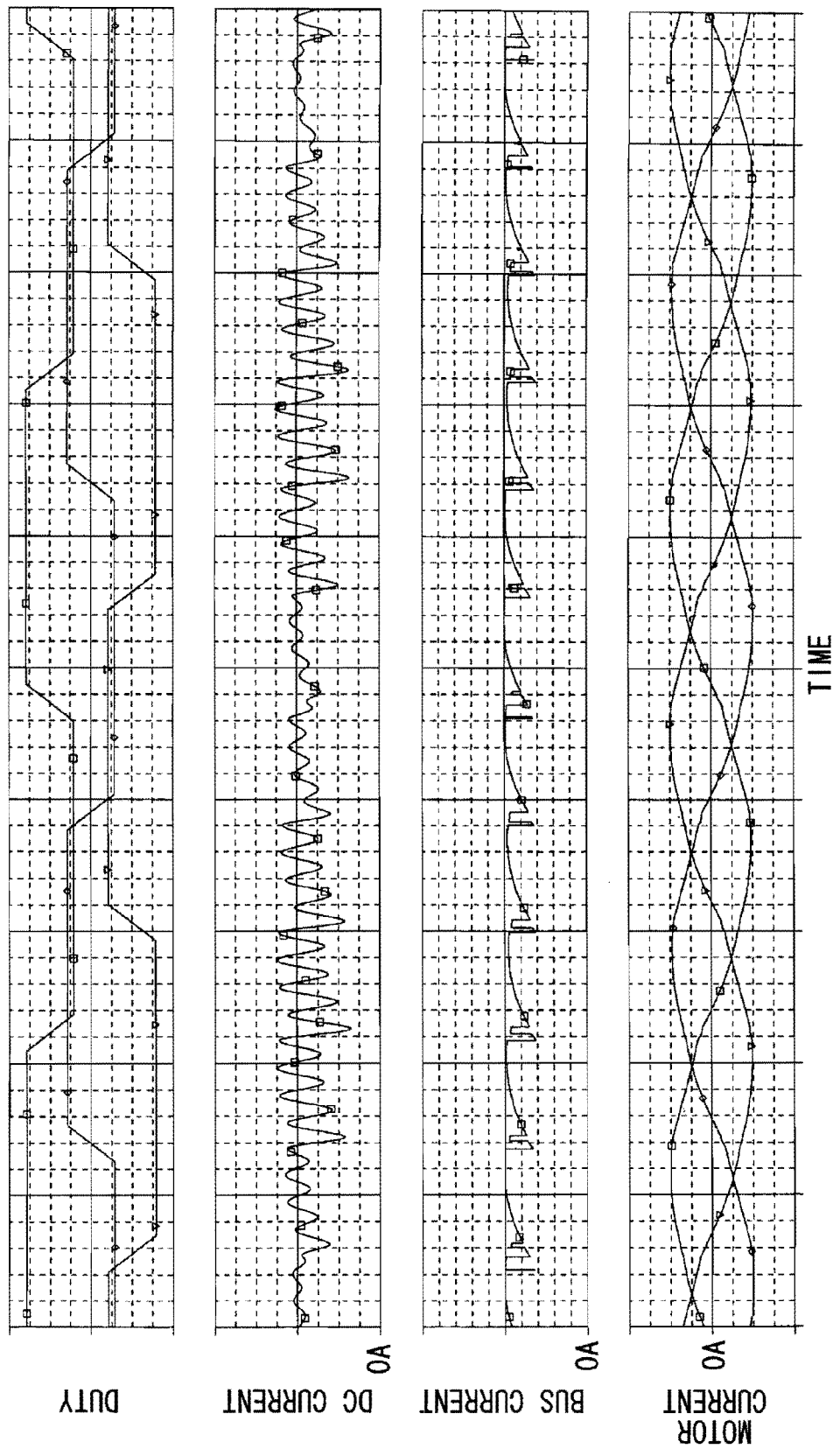
FIG. 20 is a view showing simulation results of the duty waveform, the DC current Idc, the bus current Ish, and the motor current of the U-, V-, and W-phase upper arms at the time when the overlapping phase angle is set to 10 [deg].

Further, FIG. 20 shows the U-, V- and W-phase duty waveforms of the upper arm, the DC current Idc, the bus current Ish, and the motor current at the time when the overlapping phase angle is set to 10 [deg]. FIG. 21(a) shows a result of frequency analysis of the DC current Idc shown in FIG. 20, and FIG. 21(b) shows a result of frequency analysis of the bus current Ish shown in FIG. 20. FIG. 22 shows the U-, V- and W-phase duty waveforms of the upper arm, the DC current Idc, the bus current Ish, and the motor current at the time when the overlapping phase angle is set to 30 [deg]. FIG. 23(a) shows a result of frequency analysis of the DC current Idc shown in FIG. 22, and FIG. 23(b) shows a result of frequency analysis of the bus current Ish shown in FIG. 22.

It was seen from FIG. 20 to FIG. 23 that, when the overlapping phase angle $\theta_\alpha$ is provided, not only the n-th order harmonic components of the fundamental wave component fn are reduced, but also the components of harmonics originating from the carrier frequency fc are reduced by dispersion of the energy of the harmonics.

Figure 21:
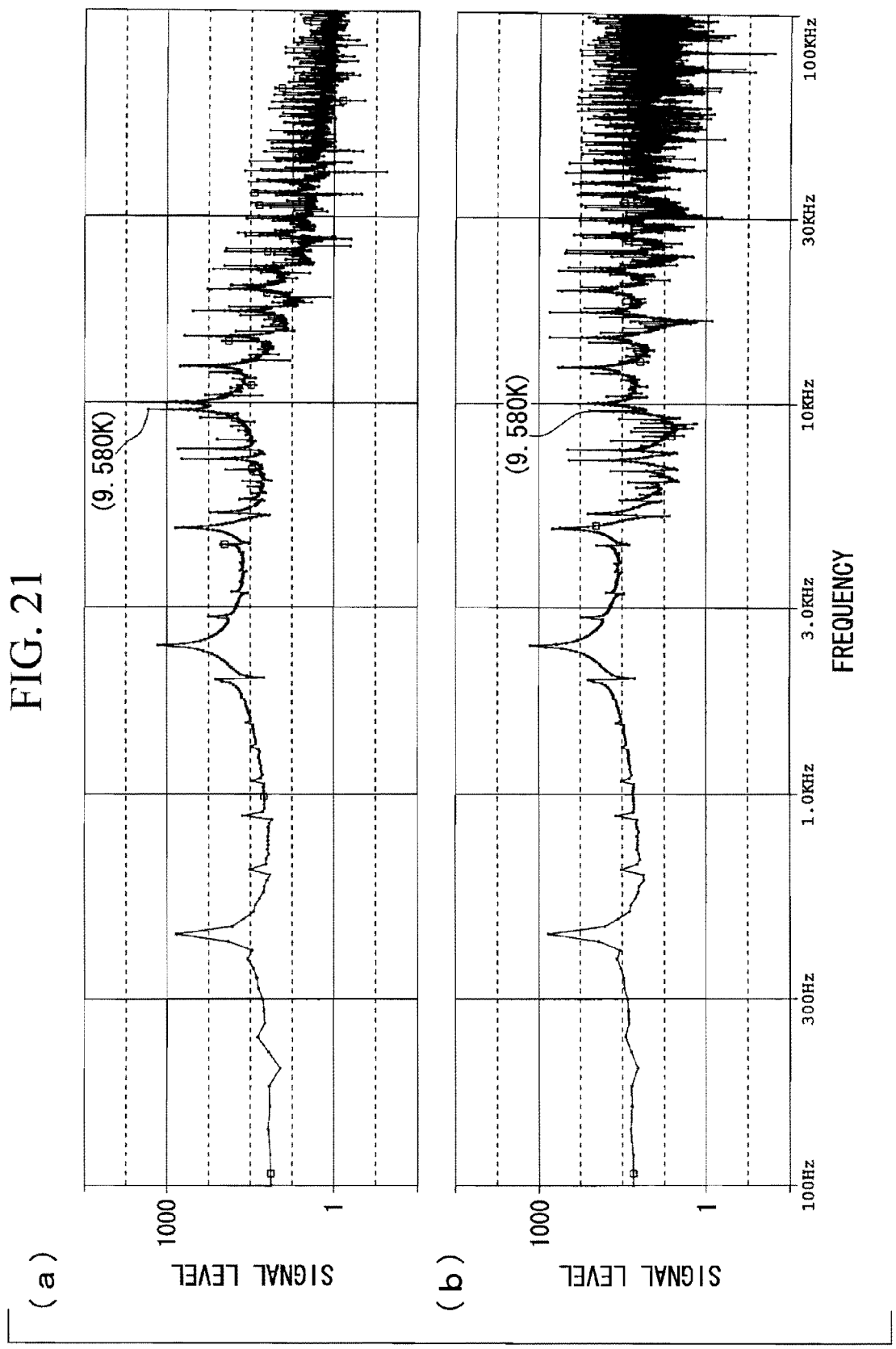
FIG. 21 is a view showing results of frequency analysis of the DC current Idc and the bus current Ish shown in FIG. 20.
Figure 22:
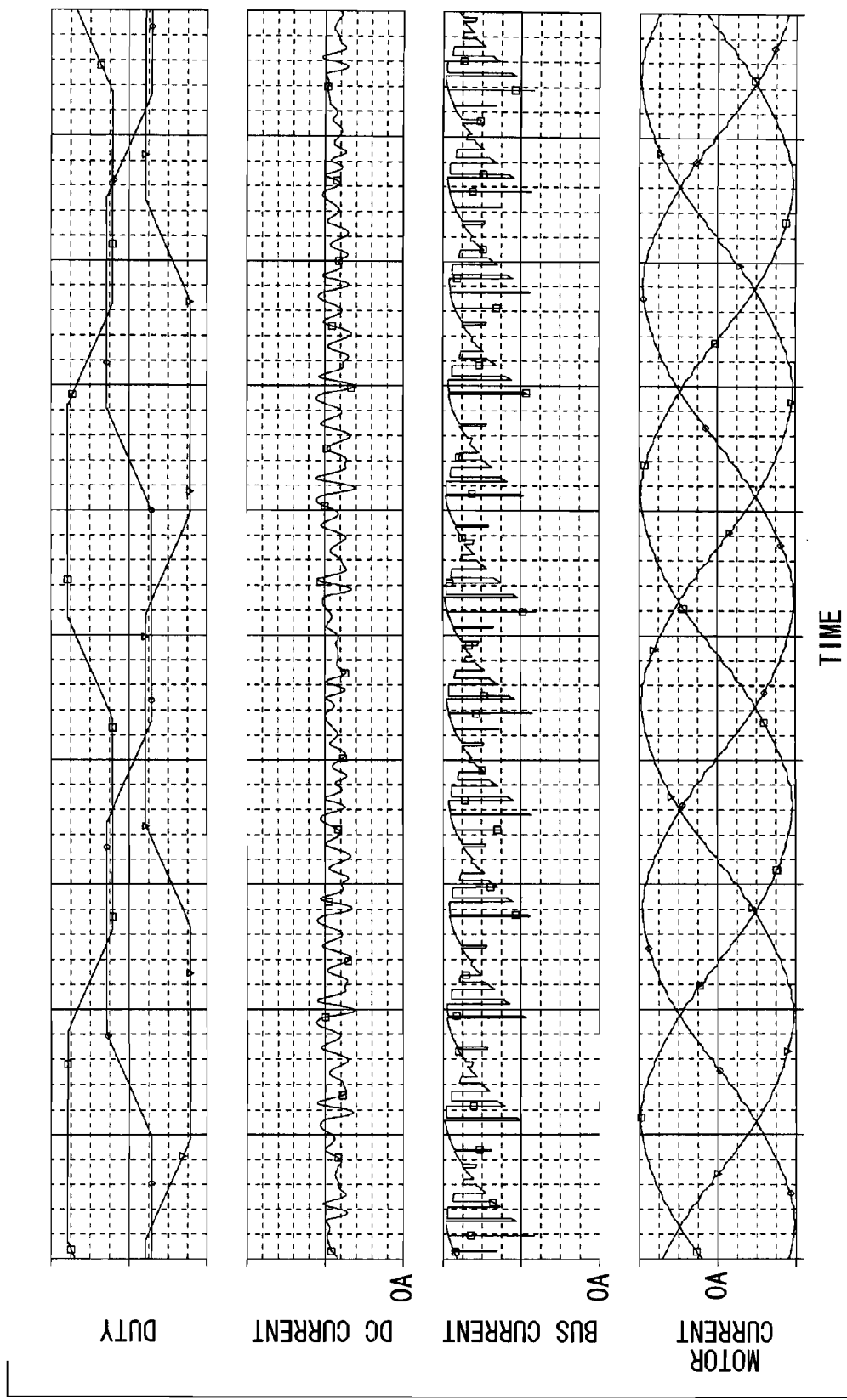
FIG. 22 is a view showing simulation results of the duty waveform, the DC current Idc, the bus current Ish, and the motor current of the U-, V-, and W-phase upper arms at the time when the overlapping phase angle is set to 30 [deg].
Figure 23:
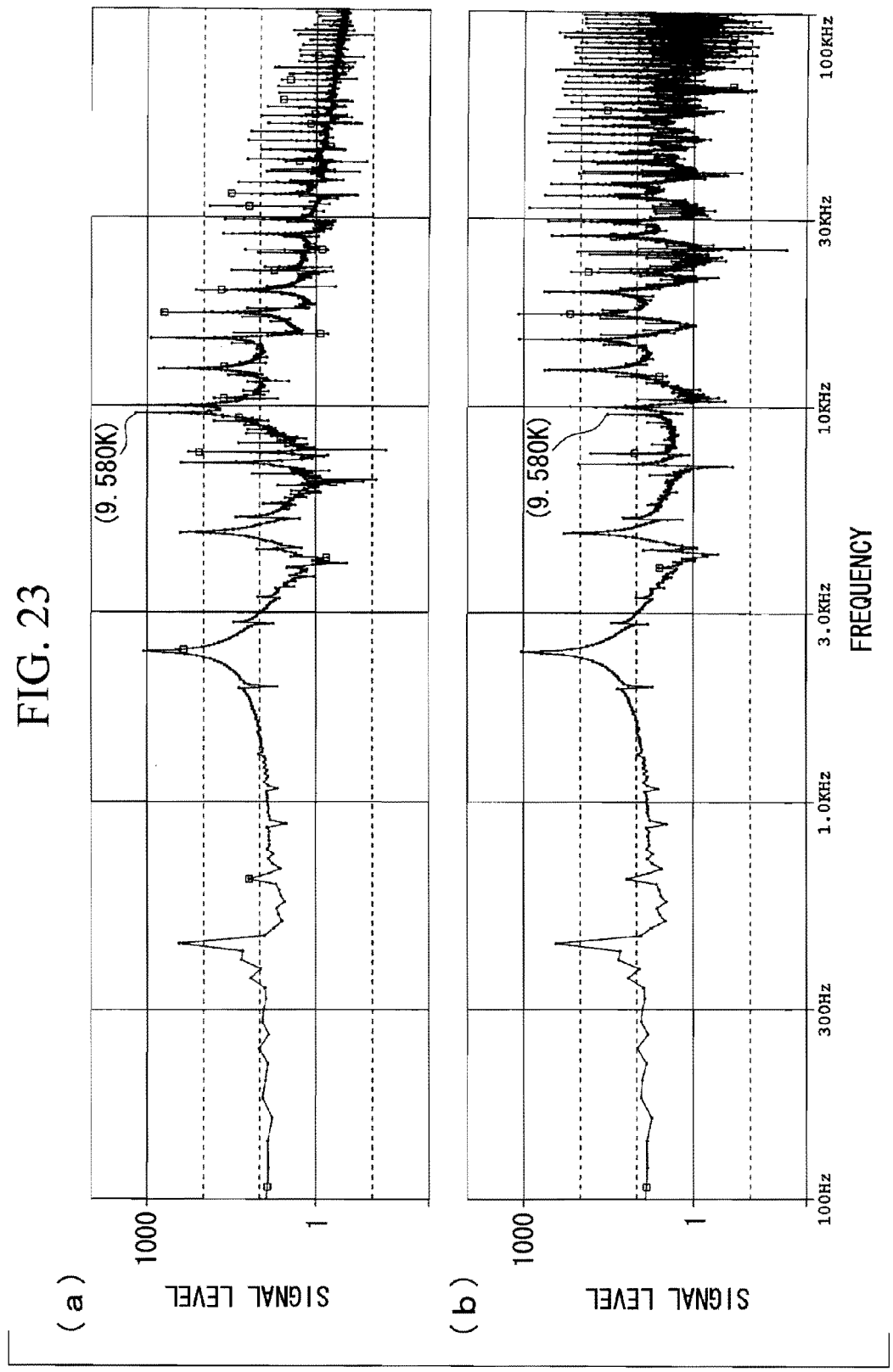
FIG. 23 is a view showing results of frequency analysis of the DC current Idc and the bus current Ish shown in FIG. 22.

Further, it was seen that the fourth harmonic component of the fundamental wave component, the component originating from the low pass filter 7 (see FIG. 1) and being remarkably shown in FIG. 4, is also reduced to a signal level substantially equal to the signal levels of the other frequency components in FIG. 21 and FIG. 23.

From the analysis results described above, it was verified that harmonic components contained in the DC current Idc can be reduced by gradually changing the duty in a predetermined phase angle width, in other words, by using an overlapping phase angle at the rising and falling edges of the duty waveform in the one-pulse control. Further, it was found that it is preferred that the overlapping phase angle $\theta_\alpha$ is set according to the power factor angle $\phi$.

In the present embodiment, a maximum value of the power factor angle in a state of large motor current is obtained beforehand by using a maximum motor rotation speed, a maximum motor torque, and the like, which can be outputted. Then, the maximum value of the power factor angle is set as the overlapping phase angle $\theta_\alpha$, and the duty waveform in the one-pulse control is generated by using this overlapping phase angle $\theta_\alpha$.

First, a maximum power factor angle $\phi_{\_max}$ in the motor drive apparatus can be obtained, for example, by the following procedures.

First, a voltage expression of the IPM motor in a steady state is given by the following expression (2).

$$\begin{bmatrix} v_d \\ v_q \end{bmatrix} = \begin{bmatrix} R & -n\omega_m L_q \\ n\omega_m L_d & R \end{bmatrix} \begin{bmatrix} i_d \\ i_q \end{bmatrix} + \begin{bmatrix} 0 \\ \Lambda_d n\omega_m \end{bmatrix} \quad (2)$$

In expression (2), R denotes winding resistance [Ω], $L_d$ denotes d-axis inductance [H], $L_q$ denotes q-axis inductance [H], $\Lambda_d$ denotes an induced voltage coefficient [V/(rad/s)], n denotes the number of pole pairs, $v_d$ denotes d-axis voltage [V], $v_q$ denotes q-axis voltage [V], $i_d$ denotes d-axis current [A], $i_q$ denotes q-axis current [A], and $\omega_m$ denotes rotation speed [rad/s].

At this time, generated torque T of the motor is expressed by the following expression (3).

$$\tau = n \cdot \Lambda_d \cdot i_q + n(L_d - L_q) i_d i_q \quad (3)$$

When it is assumed that the motor is operated at the maximum voltage $V_{max}$ which can be outputted from the inverter, the motor voltage is expressed by the following expression (4).

$$V_{max}^2 = v_d^2 + v_q^2 \quad (4)$$

In expression (4), $V_{max}$ denotes the maximum value of the output voltage of the inverter.

The voltages $v_{d\_max}$ and $v_{q\_max}$, and the currents $i_{d\_max}$ and $i_{q\_max}$ at the time when the motor is operated at the maximum load torque $\tau_{max}$ and the maximum rotation speed $\omega_{m\_max}$ can be obtained by solving a system of expressions (2) to (4) described above. By using the voltages $v_{d\_max}$ and $v_{q\_max}$ and the currents $i_{d\_max}$ and $i_{q\_max}$, the maximum power factor angle $\phi_{max}$ can be obtained by the following expression (5).

$$\phi_{max} = \tan^{-1}(v_{d\_max}/v_{q\_max}) - \tan^{-1}(i_{d\_max}/i_{q\_max}) \quad (5)$$

Next, a configuration of the motor drive apparatus according to the embodiment of the present invention will be described.

Figure 24:
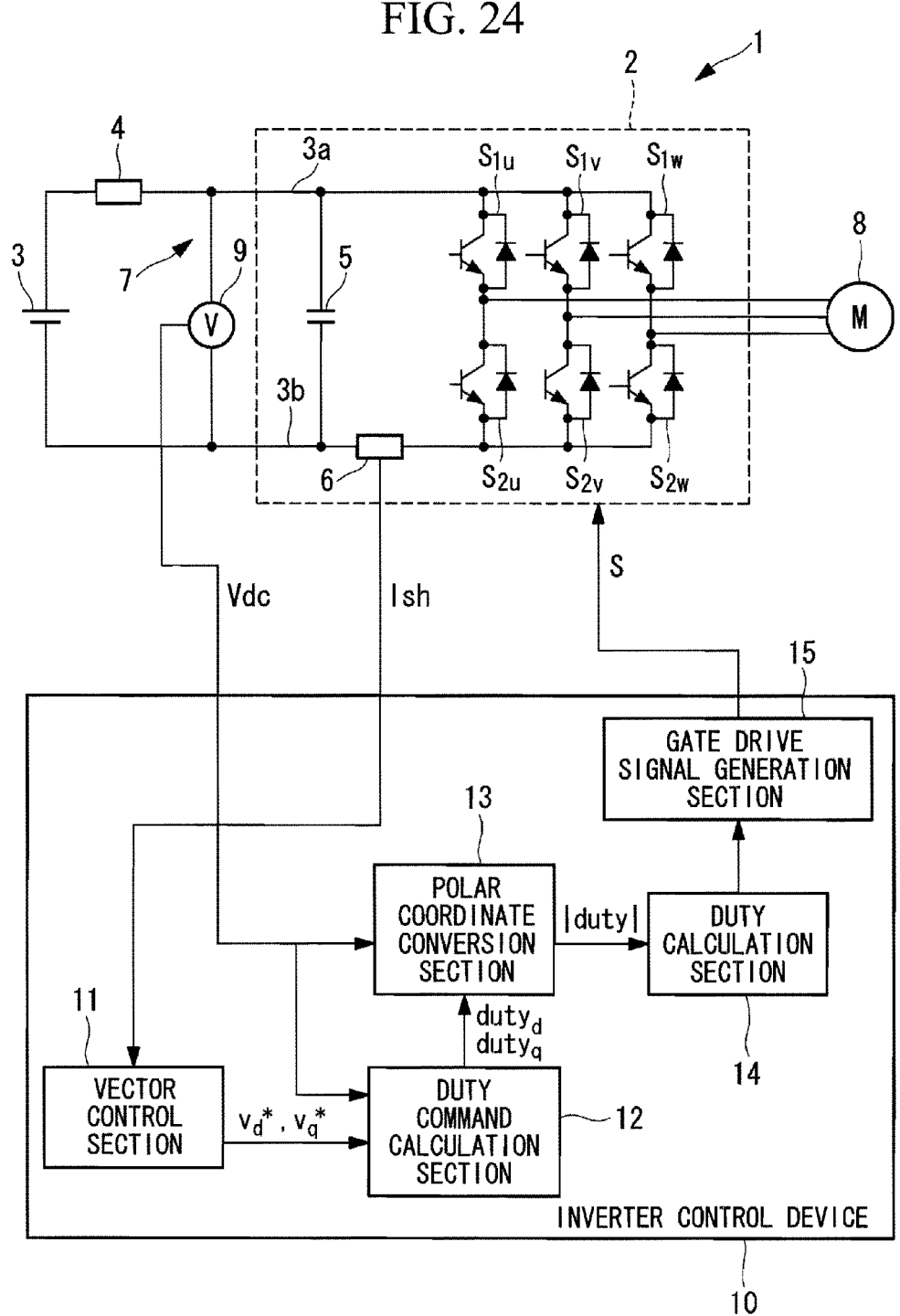
FIG. 24 is a block diagram showing a schematic configuration of a motor drive apparatus according to the embodiment of the present invention.

FIG. 24 is a block diagram showing a schematic configuration of the motor drive apparatus according to the present embodiment. In FIG. 24, the same configurations as those of the motor drive apparatus shown in FIG. 1 are denoted by the same reference numerals and characters, and explanation thereof is omitted. As shown in FIG. 24, an inverter apparatus 1 includes a current sensor 6 for detecting the bus current Ish flowing through the negative DC bus 3b, and a voltage sensor 9 for detecting the input DC voltage Vdc of the inverter 2.

The DC current Ish detected by the current sensor 6, and the input DC voltage Vdc detected by the voltage sensor 9 are inputted into an inverter control device 10. Here, examples of the current sensor 6 include a shunt resistor. It should be noted that in FIG. 24, the current sensor 6 is provided on the negative electrode side of the DC power supply 3, but may be provided on the positive electrode side.

The inverter control device 10 is, for example, an MPU (Micro Processing Unit), and includes a computer readable recording medium on which a program for executing each processing described below is recorded. Each processing described below is realized in such a manner that a CPU reads the program recorded on the recording medium to a main storage device, such as a RAM, and executes the program. Examples of the computer readable recording medium include a magnetic disk, a magneto-optical disk, a semiconductor memory, and the like.

Desired three-phase AC current is supplied to the IPM motor 8 in such a manner that the inverter control device 10 generates, for each phase, a gate drive signal S for coinciding the rotation speed of the IPM motor 8 with a motor speed command given from a host control apparatus (not shown), and controls the inverter 2 by providing the gate drive signal S to the switching element corresponding to each phase of the inverter 2.

FIG. 24 shows function blocks respectively corresponding to the functions provided in the inverter control device 10. The inverter control device 10 includes, as main components, a vector control section 11, a duty command calculation section 12, a polar coordinate conversion section 13, a duty calculation section 14, and a gate drive signal generation section 15.

The vector control section 11 calculates a d-axis voltage command $v_d^*$ and a q-axis voltage command $v_q^*$ on the basis of known vector control, and outputs these command values. These values are outputted to the duty command calculation section.

By the following expressions (6) and (7) using the input DC voltage Vdc detected by the voltage sensor 9, the duty command calculation section 12 calculates each of the d-axis duty $duty_d$ and a q-axis duty $duty_q$ from the voltage commands $v_d^*$ and $v_q^*$ received from the vector control section 11.

$$duty_d = v_d^*/(Vdc/2^{1/2}) \quad (6)$$

$$duty_q = v_q^*/(Vdc/2^{1/2}) \quad (7)$$

Figure 25:
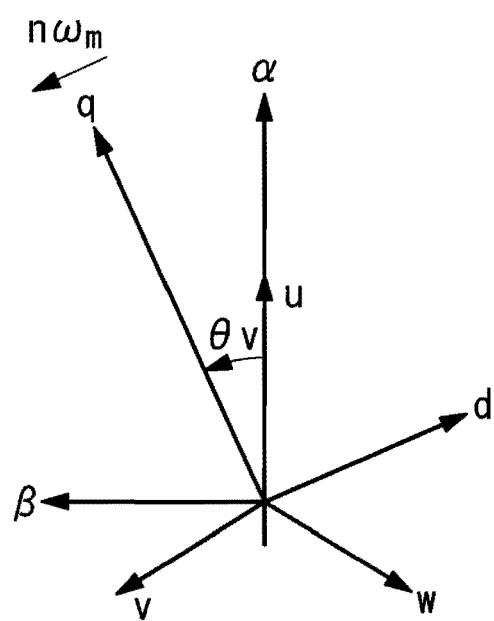
FIG. 25 is a view showing a relationship of polar coordinates with a d-axis and a q-axis.

By the following expressions (8) and (9), the polar coordinate conversion section 13 converts the d-axis duty $duty_d$ and the q-axis duty $duty_q$ described above into polar coordinates (fixed coordinates). Here, FIG. 25 shows a relationship of the polar coordinates with the d-axis and the q-axis.

$$|duty| = \sqrt{duty_d^2 + duty_q^2} \quad (8)$$

$$\theta_v = \theta - \tan^{-1}(duty_d/duty_q) \quad (9)$$

The duty calculation section 14 calculates the duty of the gate drive signal S of each phase from the polar coordinate angle $\theta_v$ and the length |duty|. Specifically, the duty calculation section 14 determines a modulation pattern from the |duty| obtained by the polar coordinate conversion section 13.

For example, when the |duty| is less than one, the duty calculation section 14 outputs a PWM signal based on usual sinusoidal wave PWM control, and when the |duty| is one or more and less than a predetermined threshold value Mx, the duty calculation section 14 outputs a PWM signal based on PWM over-modulation control. Further, when the |duty| is more than Mx, the duty calculation section 14 generates a duty waveform in which the duty gradually changed by the one-pulse control according to the present embodiment, that is, gradually changed in a preset phase angle width (2×an overlapping phase angle $\theta_\alpha$) at rising and falling edges of the duty.

Here, the overlapping phase angle $\theta_\alpha$ is set to the maximum power factor angle $\phi_{max}$ calculated beforehand by using expressions (2) to (5) described above. Further, the threshold value Mx is set to a voltage utilization factor obtained beforehand at the time of performing one-pulse control with the overlapping phase angle $\theta_\alpha$ set to the maximum power factor angle $\phi_{max}$. For example, in the example shown in FIG. 19, when the overlapping phase angle $\theta_\alpha$ is set to 10 [deg], the voltage utilization factor is about 1.10, and hence the threshold value Mx is set to, for example, 1.10.

The duty waveform generated by the duty calculation section 14 is outputted to the gate drive signal generation section 15, and the gate drive signal S is generated on the basis of the duty waveform. It should be noted that, at this time, the gate drive signal S is, for example, set so that the switching is performed at a carrier frequency in the phase angle width ($2\theta_\alpha$) in which the duty is gradually changed. The gate drive signal S generated in this way is given to each of the switching elements of the inverter 2, and the on and off of each of the switching elements are controlled on the basis of the gate drive signal S.

As described above, with the motor drive apparatus 1 according to the present embodiment, in the case where the value of |duty| is not less the Mx set beforehand, the gate drive signal S, which is set so that the duty is gradually increased or reduced in a predetermined phase angle width at rising and falling edges of the rectangular wave voltage in the one-pulse control, is generated so as to be given to each of the switching elements of the inverter 2. Thereby, it is possible to reduce the ripple (harmonic components) contained in the bus current Ish and the DC current Idc in the one-pulse control.

REFERENCE SIGNS LIST

1 Motor drive apparatus
2 Inverter
3 DC power supply
3a Positive DC bus
3b Negative DC bus
4 Coil
5 Smoothing capacitor
7 Low pass filter
8 IPM motor
10 Inverter control device
11 Vector control section
12 Duty command calculation section
13 Polar coordinate conversion section
14 Duty calculation section
15 Gate drive signal generation section

The invention claimed is:

1. A motor drive apparatus comprising:
an inverter configured to convert DC power inputted from a DC power supply via a DC bus into three-phase AC power; and
an inverter control device provided with a one-pulse control mode in which, during one electrical angle cycle, a rectangular wave voltage is applied, as gate drive signals, to a switching element corresponding to each phase,
wherein, when the one-pulse control mode is performed, the inverter control device gradually increases or reduces a duty in a predetermined phase angle width at rising and falling edges of the rectangular wave voltage,
wherein the predetermined phase angle width is set to 20 degrees or more,
wherein the inverter control device performs the one-plus control mode when an absolute value of a duty of each of the gate drive signals of the each phase is equal to or more than a predetermined threshold value, and
the predetermined threshold value is set to the same value as a voltage utilization factor at a time of performing the one-plus control mode with setting the predetermined phase angle width to be twice a maximum value of a power factor angle.

2. The motor drive apparatus according to claim 1, wherein the predetermined phase angle width is set to a value twice the maximum value of the power factor angle estimated by using a maximum motor rotation speed and a maximum motor torque.

3. The motor drive apparatus according to claim 1, wherein the predetermined phase angle width is set according to a magnitude of a ripple of a DC current flowing through the DC bus.

* * * * *